US011684095B2

(12) United States Patent
Abram et al.

(10) Patent No.: US 11,684,095 B2
(45) Date of Patent: Jun. 27, 2023

(54) MODULAR DISENGAGING SYSTEM

(71) Applicant: Simon Fraser University, Burnaby (CA)

(72) Inventors: Daniel Eamon Abram, Vancouver (CA); Farid Golnaraghi, West Vancouver (CA); Gaofeng Gary Wang, Surrey (CA); Combiz Jelveh, North Vancouver (CA)

(73) Assignee: Simon Fraser University, Burnaby (CA)

( * ) Notice: Subject to any disclaimer, the term of this patent is extended or adjusted under 35 U.S.C. 154(b) by 702 days.

(21) Appl. No.: 16/138,864

(22) Filed: Sep. 21, 2018

(65) Prior Publication Data

US 2019/0021413 A1 Jan. 24, 2019

Related U.S. Application Data

(63) Continuation of application No. PCT/CA2017/050370, filed on Mar. 23, 2017.
(Continued)

(51) Int. Cl.
*A41D 13/015* (2006.01)
*A42B 3/06* (2006.01)
(Continued)

(52) U.S. Cl.
CPC ....... *A41D 13/015* (2013.01); *A41D 13/0506* (2013.01); *A41D 13/0512* (2013.01);
(Continued)

(58) Field of Classification Search
CPC .............. A41D 13/015; A41D 13/0506; A41D 13/0512; A41D 13/0518; A41D 13/0531;
(Continued)

(56) References Cited

U.S. PATENT DOCUMENTS

2016/0255900 A1* 9/2016 Browd .................... A42B 3/30

FOREIGN PATENT DOCUMENTS

| CA | 2 874 768 C | 1/2013 |
|---|---|---|
| CA | 2934368 A1 | 6/2015 |

(Continued)

OTHER PUBLICATIONS

Chinese Second Office Action, dated Dec. 8, 2020, issued in corresponding Chinese Application No. 201780031600.6, filed Mar. 23, 2017, 33 pages.
(Continued)

*Primary Examiner* — Sally Haden
(74) *Attorney, Agent, or Firm* — Christensen O'Connor Johnson Kindness PLLC

(57) ABSTRACT

The present disclosure seeks to reduce the effects of rotational and linear acceleration experienced by the body of a user in response to an impact force. Modular disengaging systems of the present disclosure are generally suitable for coupling to protective equipment to provide a disengaging motion between various layers such that the effects of the impact force to the body of the user are reduced. Generally described, the modular disengaging systems of the present disclosure include layers configured to facilitate relative lateral motion therebetween upon an impact force.

21 Claims, 12 Drawing Sheets

Related U.S. Application Data

(60) Provisional application No. 62/312,329, filed on Mar. 23, 2016.

(51) Int. Cl.

| | |
|---|---|
| *B32B 7/08* | (2019.01) |
| *A63B 71/08* | (2006.01) |
| *A63B 71/10* | (2006.01) |
| *A63B 71/12* | (2006.01) |
| *A41D 31/18* | (2019.01) |
| *A41D 13/05* | (2006.01) |
| *A41D 13/06* | (2006.01) |
| *A41D 13/08* | (2006.01) |
| *A42B 3/12* | (2006.01) |
| *A42B 3/14* | (2006.01) |

(52) U.S. Cl.
CPC ..... *A41D 13/0518* (2013.01); *A41D 13/0531* (2013.01); *A41D 13/0543* (2013.01); *A41D 13/065* (2013.01); *A41D 13/08* (2013.01); *A41D 31/185* (2019.02); *A42B 3/064* (2013.01); *A42B 3/121* (2013.01); *A63B 71/08* (2013.01); *A63B 71/081* (2013.01); *A63B 71/10* (2013.01); *A63B 71/12* (2013.01); *A63B 71/1225* (2013.01); *A63B 71/1291* (2013.01); *B32B 7/08* (2013.01); *A41D 2600/10* (2013.01); *A41D 2600/104* (2013.01); *A42B 3/14* (2013.01); *A63B 2071/125* (2013.01); *A63B 2071/1208* (2013.01); *A63B 2071/1233* (2013.01); *A63B 2071/1258* (2013.01); *A63B 2071/1275* (2013.01); *A63B 2071/1283* (2013.01); *A63B 2209/10* (2013.01); *B32B 2250/04* (2013.01); *B32B 2307/56* (2013.01); *B32B 2437/04* (2013.01); *B32B 2571/00* (2013.01)

(58) Field of Classification Search
CPC .. A41D 13/0543; A41D 13/065; A41D 13/08; A41D 31/185; A41D 2600/10; A41D 2600/104; A42B 3/064; A42B 3/121; A42B 3/14; A63B 71/08; A63B 71/081; A63B 71/10; A63B 71/12; A63B 71/1225; A63B 71/1291; A63B 2071/1208; A63B 2071/1233; A63B 2071/125; A63B 2071/1258; A63B 2071/1275; A63B 2071/1283; A63B 2209/10; B32B 7/08; B32B 2250/04; B32B 2307/56; B32B 2437/04; B32B 2571/00

See application file for complete search history.

(56) References Cited

FOREIGN PATENT DOCUMENTS

| | | |
|---|---|---|
| CA | 2 864 522 C | 9/2015 |
| CN | 104244754 A | 12/2014 |
| CN | 104427896 A | 3/2015 |
| WO | 2014/204966 A1 | 12/2014 |

OTHER PUBLICATIONS

Machine Translation of Chinese First Office Action, dated Feb. 19, 2020, issued in corresponding Chinese Application No. 201780031600.6, filed Mar. 23, 2017, 29 pages.

International Search Report and Written Opinion dated Jun. 19, 2017 issued in corresponding International Application No. PCT/2017/050370, filed Mar. 23, 2017, 9 pages.

Extended European Search Report, dated Oct. 15, 2019, issued in corresponding European Patent Application No. 17769222.5, filed Mar. 23, 2017, 6 pages.

Communication pursuant to Article 94(3) EPC, dated Sep. 30, 2020, issued in corresponding European Application No. 17769222.5, filed Mar. 23, 2017, 5 pages.

Fourth Office Action dated Aug. 4, 2022, from Chinese Application No. 201780031600.6, filed Mar. 23, 2017, 33 pages.

* cited by examiner

MODULAR DISENGAGING SYSTEM

CROSS-REFERENCES TO RELATED APPLICATIONS

This application is a continuation of International Patent Application No. PCT/CA2017/050370, filed on Mar. 23, 2017, which claims the benefit of Provisional Application No. 62/312,329, filed Mar. 23, 2016; the entire disclosures of said applications are hereby incorporated by reference herein.

BACKGROUND

Many impacts to an object strike obliquely, causing the impacted object to experience a combination of linear and rotational accelerations. The accelerations resulting from the oblique impact can be destructive to the impacted object. In order to enhance the protection efficiency when using shielding equipment, consideration should be given to mitigating both linear and rotational accelerations.

Currently, standard shielding equipment is designed, tested, and certified based primarily on linear acceleration. As a result, the equipment can lack the ability to mitigate rotational acceleration, leaving the impacted object vulnerable to further damage. In one use, the shielding equipment may be worn on the human body, providing protection to areas including the head, neck, shoulders, upper arms, elbows, forearms, wrists, hands, chest, back, spine, hips, thighs, knees, shins, ankles, and feet.

In the instance of the human head, traumatic brain injuries are among the most prevalent and fatal injuries in contact sports and many other high-risk activities where a combination of linear and rotational accelerations can lead to severe injuries or death. Rotational acceleration can be an overlooked component that causes head injuries and concussions in contact sports and activities such as football, soccer, cycling, hockey, snowboarding, skiing, construction, and industrial and military activities.

Recent studies in the area of traumatic brain injuries have shown that shear forces on the brain resulting from rotational acceleration can cause significantly more damage to brain cells than normal forces. Some studies show that human brain tissue is approximately one million times more sensitive to shear force than a compression force applied during an impact.

Numerous helmet designs exist, many optimized for different groups of activities. Frequently, a helmet structure comprises a hard outer shell, a compressible impact absorbing liner, a fitting liner, a retention system, and an optional adjustable head fitting system. The outer shell is designed to prevent penetration to the interior of the helmet and to distribute the impact force over a larger area, such as the area of the impact absorbing liner. The impact absorbing liner, such as those manufactured from expandable polystyrene (EPS), functions by compressing during impact, thus absorbing a portion of the energy of the impact. This impact absorbing liner also decreases the linear acceleration felt by the brain during an impact. The fitting liner functions to hold the head of a wearer in place and to provide a comfortable feel for the head of the wearer. Some helmets also include adjustable or non-adjustable fitting systems to conform to the wearer's head. By using an adjustable dial, clipping system, belt notches, anchor points, or elastic band, these fitting systems can have their height and circumference adjusted for a better fit to a wearer's head.

The two main worksite protective helmet types are hard hats and bump caps. Hard hats are used in worksites to prevent injury due to falling objects. Bump caps, however, are used where there is a chance of colliding one's head on equipment or structure, but are frequently not adequate to absorb large impacts such as falling objects. These protective helmet types have a similar structure to traditional helmets but with several key differences. Firstly, there is often no impact-absorbing liner in a hard hat or bump cap. The hard hat is usually comprised of a hard rigid shell, suspension bands, and a fitting system. The hard shell provides penetration protection from falling objects and distributes the impact load evenly to the suspension bands. The suspension bands raise the rigid shell distally above the head of a wearer and deform during an impact to spread the impact load over the top of the head. In addition, the suspension bands absorb some of the impact energy. The gap between the head and the shell also decreases the likelihood of the impact being directly transferred to the head of a user. The fitting system can be adjustable or non-adjustable to conform to the wearer's head. By using an adjustable dial, clipping system, belt notches, anchor points, or elastic band, these fitting systems can have their height and circumference of the fitting rim adjusted for a better fit to a wearer's head. Bump caps can differ from hard hats through the use of simplified suspension bands and a chin strap retention system.

Currently, many helmets are designed, tested, and certified for translational linear acceleration only. As a result, current helmets can be effective in reducing the linear acceleration during radial impacts, but often lack performance in reducing rotational acceleration. Recent studies have shown that rotational acceleration is one of the major causes of head injury. Some technologies exist to address rotational acceleration during impact, but require large modifications to the structure of the helmet. This can lead to large production lead times, higher costs, and lower versatility. Hence, there is a need to develop technology to reduce rotational acceleration without large structural changes to protective helmets. Due to the high cost of changing manufacturing processes, an independent modular technology is preferred.

Therefore, a need exists for a modular system that can be coupled to protective equipment that reduces the effects of rotational and linear acceleration. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment disclosed herein, a modular disengaging system for interfacing with the body of a user is provided. The modular disengaging system generally includes a first layer couplable to a body-facing surface of a protective equipment; a second layer positioned adjacent to the first layer; a third layer positioned adjacent to the second layer; and a fourth layer positioned adjacent and coupled to the third layer, the fourth layer configured to contact the body of the user; wherein the first layer may be coupled to the third layer to form an enveloped space enclosing at least a portion of the second layer between the first layer and the third layer; wherein the second layer may be configured to facilitate relative lateral motion between the first layer and the third layer upon an impact force acting on the modular disengaging system to reduce rotational acceleration and linear acceleration of the body of the user; and wherein an area of the modular disengaging system may be smaller than the area of the body-facing surface.

In accordance with embodiments disclosed herein, a protective system is provided. The protective system generally includes a protective equipment having a body-facing surface and a modular disengaging system according to any aspect or embodiment provided herein.

In accordance with embodiments disclosed herein, a kit is provided. The kit generally includes a plurality of modular disengaging systems, wherein each of the plurality of modular disengaging systems may be configured to be couplable to a body-facing surface of the protective equipment.

In accordance with any of the embodiments disclosed herein, the modular disengaging system may be configured to be couplable to a rib member of the protective equipment.

In accordance with any of the embodiments disclosed herein, the first layer may be configured to be directly coupled to the body-facing surface of the protective equipment.

In accordance with any of the embodiments disclosed herein, the second layer may include a lubricant.

In accordance with any of the embodiments disclosed herein, the second layer may include a plurality of filaments bridging the first layer and the third layer.

In accordance with any of the embodiments disclosed herein, the plurality of filaments may have a diameter in the range from about 0.1 mm to about 10 mm and a height in the range from about 0.1 mm to about 10 mm.

In accordance with any of the embodiments disclosed herein, the plurality filaments may have a cross-sectional geometry selected from the group consisting of circular, square, triangular, rectangular, polygonal, and ovoid.

In accordance with any of the embodiments disclosed herein, the first layer may include an anchoring layer configured to removably couple the modular disengaging system to the body-facing surface of the protective equipment.

In accordance with any of the embodiments disclosed herein, the anchoring layer may include a material selected from the group consisting of hook and loop closures, adhesive, stitches, glue, a button system, a clip system, a peel-and-stick material, and combinations thereof.

In accordance with any of the embodiments disclosed herein, the modular disengaging system may be configured to conform to the body-facing surface of the protective equipment.

In accordance with any of the embodiments disclosed herein, the modular disengaging system may be configured to be couplable to a fitting system of the protective equipment.

In accordance with any of the embodiments disclosed herein, the modular disengaging system may be configured to be couplable to a rib member of the protective equipment.

In accordance with any of the embodiments disclosed herein, the first layer and the third layer may be coupled at the edges of the first layer and the third layer.

In accordance with any of the embodiments disclosed herein, the first layer and the third layer may be coupled at a perimeter of the modular disengaging system.

In accordance with any of the embodiments disclosed herein, the first layer and the third layer may be coupled using a coupling selected from the group consisting of a heat seal, a radio frequency seal, a sonic frequency seal, an ultrasonic frequency seal, hook and loop closures, an adhesive, stitches, a button system, a clipping system, a peel-and-stick material, and combinations thereof.

In accordance with any of the embodiments disclosed herein, the modular disengaging system may include a plurality of intermediary layers disposed between the first layer and the third layer. Each of the plurality of intermediary layers may include a disengaging layer therebetween, wherein the disengaging layer may be configured to facilitate lateral relative motion between the intermediary layers, and wherein the plurality of intermediary layers may be configured to facilitate lateral relative motion between the first and third layer upon an impact force acting on the modular disengaging system.

In accordance with any of the embodiments disclosed herein, the second layer may include a lubricant, wherein the lubricant may be selected from the group consisting of a liquid, a solid, and a gas.

In accordance with any of the embodiments disclosed herein, the fourth layer may be composed of a material selected from the group consisting of foam, fabric, fibers, thermoplastic fibers, a gel-filled sack, a silicone gel pad, and combinations thereof.

In accordance with any of the embodiments disclosed herein, the fourth layer may be coupled to the third layer using a coupling selected from the group consisting of a heat seal, a radio frequency seal, a sonic frequency seal, an ultrasonic frequency seal, hook and loop closures, an adhesive, stitches, a button system, a clipping system, a peel-and-stick material, and combinations thereof.

In accordance with any of the embodiments disclosed herein, the fourth layer may be coupled to the third layer at the perimeter of the third layer.

In accordance with any of the embodiments disclosed herein, the fourth layer may be coupled to the surface of the third layer.

In accordance with any of the embodiments disclosed herein, the modular disengaging system may include a plurality of fourth layers that are coupled to the third layer.

In accordance with any of the embodiments disclosed herein, the modular disengaging system may be one of a plurality of modular disengaging systems, each removably coupled or couplable to a portion of the body-facing surface. In certain embodiments, each of the plurality of modular disengaging systems may be configured to be couplable to a different portion of the body-facing surface of the protective equipment.

In accordance with any of the embodiments disclosed herein, the protective equipment may be configured to be worn on the part of the body selected from the group consisting of the head, neck, shoulders, upper arms, elbows, forearms, wrists, hands, chest, back, spine, hips, thighs, knees, shins, ankles, feet, and a combination thereof.

In accordance with any of the embodiments disclosed herein, the protective equipment is selected from the group consisting of a helmet, a shoulder pad, a neck pad, an arm pad, a wrist pad, a knee pad, a glove, an elbow pad, a shin pad, a hip pad, a sternum pad, a back pad, an ankle pad, a foot pad, and a shoe.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
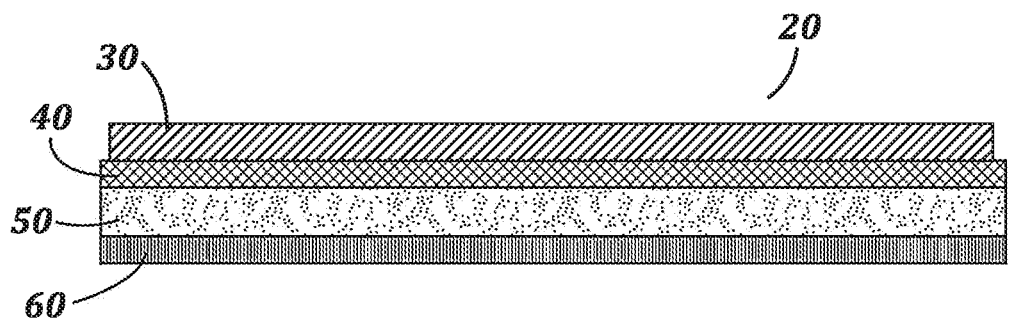
FIGS. 1A and 1B are respectively an illustration of side view and an illustration of a corresponding isometric view of a Modular Disengaging System (hereinafter, MDS) formed in accordance with one representative embodiment of the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein are interchangeable with other steps, or combinations of steps, in order to achieve the same or substantially similar result.

Both linear acceleration and rotational acceleration are key factors in traumatic brain injury (TBI). Yet, currently, the majority of helmets are only designed to reduce linear translational acceleration during impact load events, leaving rotational acceleration unaddressed. Further, many protective aspects of currently available pieces of protective equipment are integral to those pieces of protective equipment as a result of complex manufacturing methods. Accordingly, they are not modular or easily applied to other widely available pieces of protective equipment.

The present disclosure relates to several examples of a modular impact diverting mechanism, referenced herein as a Modular Disengaging System (MDS), couplable to a protective equipment. The MDS can be coupled to a surface of protective equipment, such as a helmet. Specifically, the present disclosure relates to an MDS configured to couple to a body-facing surface of protective equipment either replacing a fitting liner or functioning as a fitting liner fastening surface. The MDSs of the present disclosure are configured to mitigate rotational acceleration and linear acceleration felt by the body of a user during an impact to a surface of the protective equipment.

As used herein, a "body-facing surface" refers to a surface configured to contact or otherwise interface with a portion of the body of a user.

In certain embodiments, the present disclosure provides an MDS couplable to a body-facing surface of a protective equipment. In certain embodiments, the MDS is configured to reduce the rotational acceleration of the body of a wearer during an impact to protective equipment, such as a helmet. In certain embodiments, an MDS as disclosed herein is cost-effective to manufacture and easy to couple to a body-facing surface of protective equipment due to its modular design. Furthermore, in certain embodiments, an MDS as disclosed herein does not require structural or other changes to couple to an existing piece of protective equipment. Because the MDS are couplable to a body-facing surface of the protective equipment, the MDS can provide additional protection to the protective equipment without complex manufacturing or other measures to integrate the MDS into the protective equipment.

The present application may include references to directions, such as "forward," "rearward," "front," "back," "upward," "downward," "right hand," "left hand," "lateral," "medial," "in," "out," "extended," "advanced," "retracted," "proximal," "distal," "central," etc. These references, and other similar references in the present application, are intended only to assist in helping describe and understand the particular embodiment and are not intended to limit the present disclosure to these directions or locations.

The present application may also reference quantities and numbers. Unless specifically stated, such quantities and numbers are not to be considered restrictive, but are exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

In one aspect, modular disengaging systems are provided. In certain embodiments, the MDS incorporate one or more aspects and embodiments described elsewhere herein. In some embodiments an MDS includes a multi-layer structure between a portion of the wearer's body and a body-facing surface of the protective equipment. The MDS generally includes a first layer couplable to a body-facing surface of a protective equipment, a second layer positioned adjacent to the first layer, a third layer positioned adjacent to the second layer, and a fourth layer positioned adjacent and coupled to the third layer, where the fourth layer is configured to contact the body of the user.

Figure 1B:
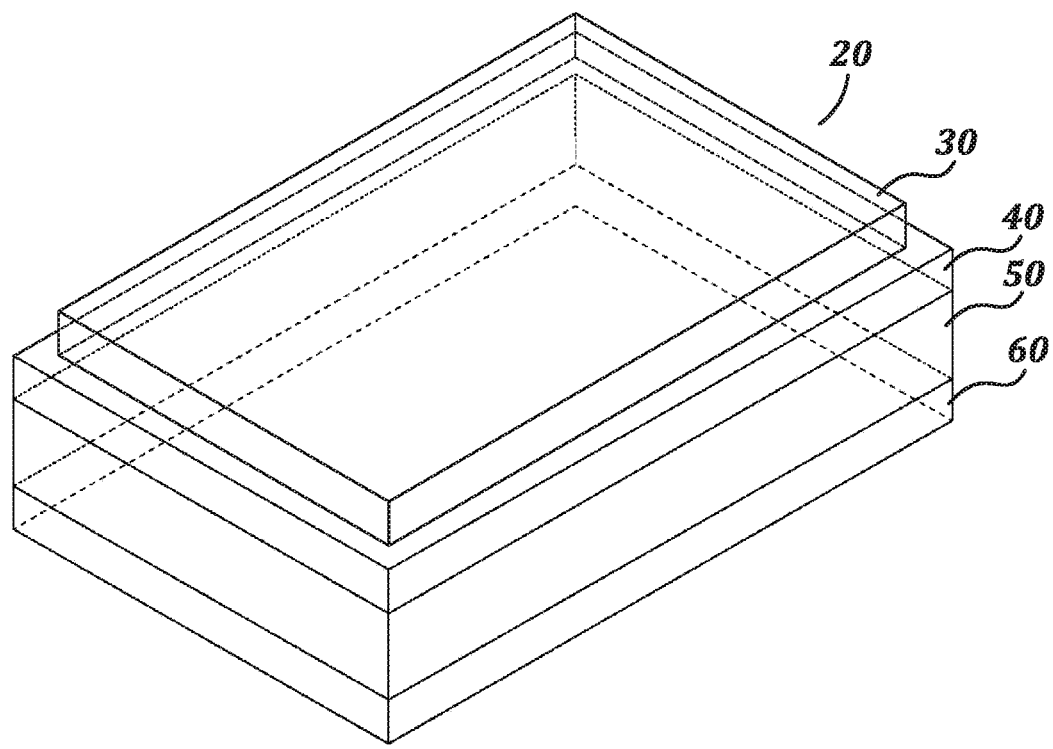

Turning to FIGS. 1A and 1B, a representative embodiment of an MDS 20 in isolation from a protective equipment is provided. As shown, four layers are illustrated: a first layer 60 couplable to a body-facing surface 96 of a protective equipment 90 (see FIG. 2); a second layer 50 positioned adjacent to the first layer 60; a third layer 40 positioned adjacent to the second layer 50; and a fourth layer 30 positioned adjacent and coupled to the third layer 40, the fourth layer 30 configured to contact the body of the user 80 (see FIG. 2). The second layer 50 is configured to facilitate relative lateral motion between the first layer 60 and the third layer 40 upon an impact force acting on the MDS 20 thereby reducing rotational acceleration and linear acceleration of the body of the user 80.

Figure 2:
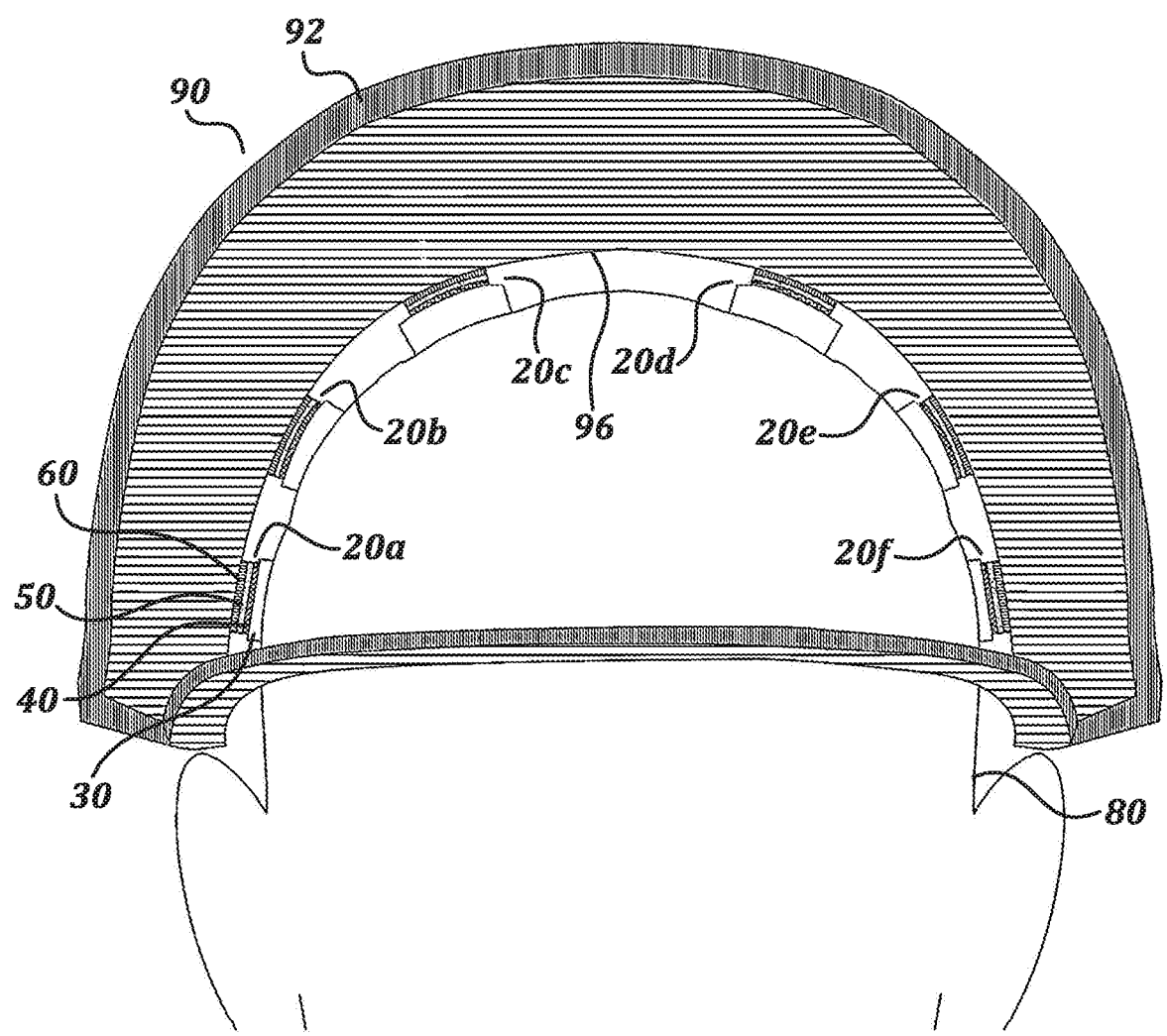
FIG. 2 is an illustration of a plurality of the MDS of FIG. 1A coupled to a body-facing surface of a helmet.

In accordance with an embodiment of the present disclosure, the MDS 20 is couplable to the protective equipment 90. As illustrated in FIG. 2, in certain embodiments an MDS 20 is couplable to a body-facing surface 96 of the protective equipment 90, in this case, a helmet. However, in other embodiments, the protective equipment 90 is any suitable equipment configured to protect a surface from impact. As illustrated, the MDS 20 is coupled to the body-facing surface 96 through the first layer 60. Likewise, in embodiments where the protective equipment is worn by a user 80, the fourth layer 30 is configured to contact the body of the user 80. Between the first layer 60 and the fourth layer 30 are the second layer 50 and the third layer 40.

As above, the second layer 50 is configured to facilitate relative lateral motion between the first layer 60 and the third layer 40 upon an impact force acting on the MDS 20 to reduce rotational acceleration and linear acceleration of the body of the user 80. In certain embodiments, the fourth layer 30 is coupled to the third layer 40 using a coupling that may include a heat seal, a radio frequency seal, a sonic frequency seal, an ultrasonic frequency seal, hook and loop closures, an adhesive, stitches, a button system, a clipping system, a peel-and-stick material, and combinations thereof.

In some embodiments, the MDS 20 covers the entire area of the body-facing surface 96 of the protective equipment 90. In other embodiments, the MDS 20 is smaller than the area of the body-facing surface 96 of protective equipment to which it is couplable. In these embodiments, as illustrated in FIG. 2, a plurality of MDSs 20a-f can be coupled to a protective equipment 90. As illustrated, each MDS 20 can be coupled to a different and/or separate portion of the protective equipment 90 and, accordingly, configured to contact a different and/or separate portion of the body of a user 80.

In view of the foregoing, by coupling the plurality of MDSs 20 to different and/or separate portions of the body-facing surface 96 of the protective equipment 90, a user 80 can modularly enhance protection to numerous portions of the protective equipment 90. In so doing, a protective equipment 90 is further protected against impact forces acting on multiple portions of the protective equipment 90 and/or impinging upon the protective equipment 90 from different angles.

Still referencing FIGS. 1A, 1B, and 2, in certain embodiments the first layer 60 comprises an anchoring layer 160 (see FIG. 12A) configured to removably couple the MDS 20 to the body-facing surface 96 of the protective equipment 90. Such an anchoring layer 160 is useful in directly coupling the MDS 20 to the protective equipment 90. In certain embodiments, the anchoring layer 160 includes one or a plurality of fasteners configured to couple the first layer 60 to the body-facing surface 96 of the protective equipment 90. In certain embodiments, the anchoring layer 160 comprises a fastener that may include hook and loop closures, adhesive, stitches, glue, a button system, a clip system, a peel-and-stick material, and combinations thereof. In certain embodiments, the adhesive is a pressure sensitive adhesive and the body-facing surface 96 is smooth. By removably coupling the MDS 20 to the body-facing surface 96 of the protective equipment 90, a user 80 can configure the position and orientation of the MDS 20 on protective equipment 90 according to the needs of a user 80 and the shape of the portion of the body of a user 80 that the MDS 20 is configured to contact.

In certain embodiments, the MDS 20 is configured to fixedly couple to a protective equipment 90. Such embodiments include an MDS 20 configured to be co-molded with a portion of a protective equipment 90.

In some embodiments of the present disclosure, the fourth layer 30 is a fitting liner configured to contact a portion of the body of a user 80. In certain embodiments, the fitting liner 30 comprises a fabric material. In certain embodiments, the fitting liner 30 is composed of a material that may include foam, fabric, fibers, thermoplastic fibers, a gel-filled sack, a silicone gel pad, and combinations thereof. In an embodiment, the fitting liner 30 is configured to be comfortable on the skin of a user 80.

Figure 3:
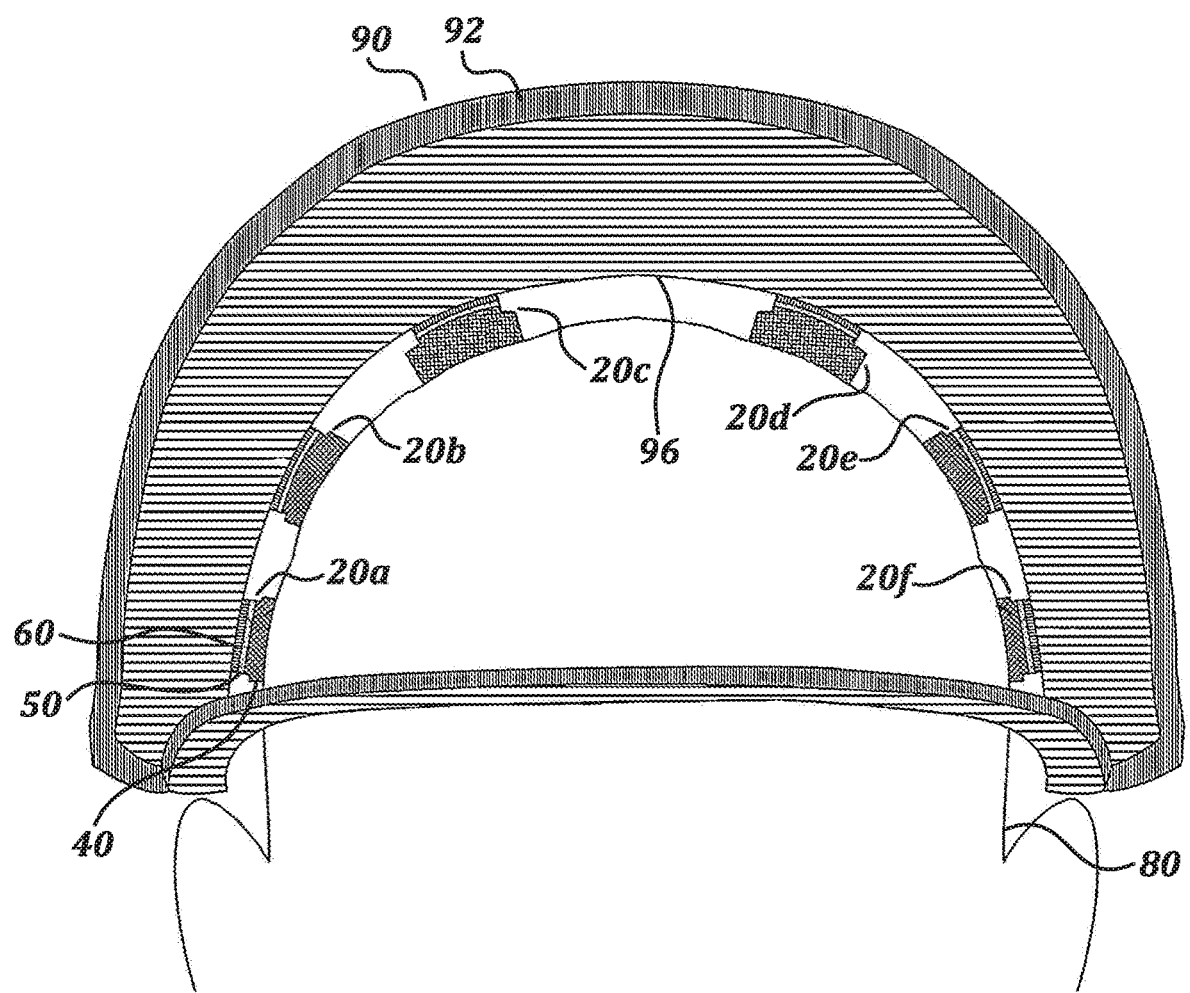
FIG. 3 is an illustration of a plurality of the MDS of FIG. 1A applied to a body-facing surface of a helmet.

In certain embodiments, the fourth layer 30 is coupled to the third layer 40. In these embodiments, the coupling is suitably a plurality of flexible small hooks (not shown) protruding from the surface of the third layer 40. The plurality of flexible small hooks is configured to sink into the fabric material of the fitting liner 30 and grip the fabric, thereby coupling the fabric fitting liner 30 to the third layer 40. In some embodiments, the fourth layer 30 is omitted, as shown in FIG. 3.

In another embodiment, the fitting liner 30 includes a male or female component of a mechanical clipping device (not shown), such as a clip-button system affixed to the fitting liner 30. In such embodiments, the third layer 40 includes a corresponding clip component configured to clip into the clip component of the mechanical clipping device on the fitting liner 30. In another example, the fitting liner 30 is coupled to the third layer 40 by stitches woven through the fabric material (not shown). In an embodiment, the fitting liner 30 is coupled to the third layer 40 with an adhesive (not shown).

Figure 4A:
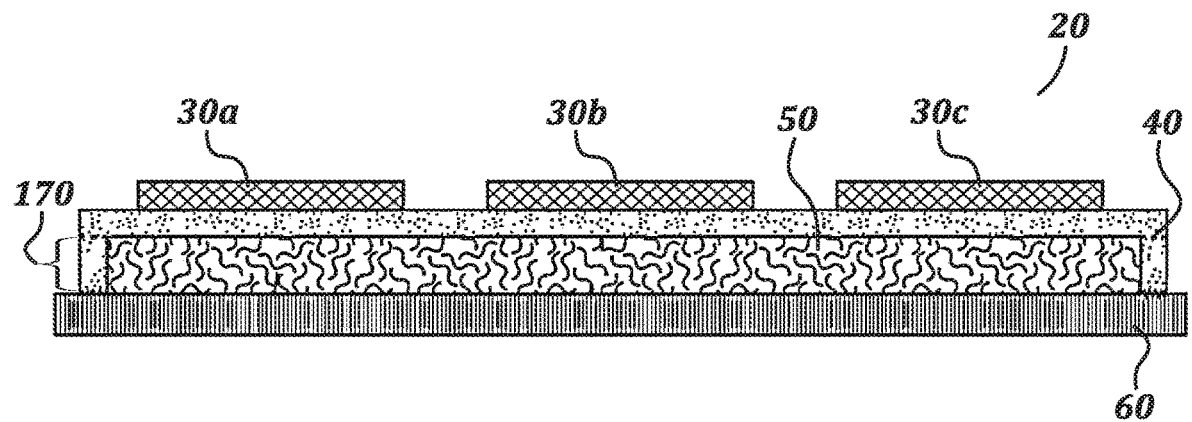
FIGS. 4A and 4B are respectively an illustration of a side view and an illustration of a corresponding isometric view of an MDS formed in accordance with another representative embodiment of the present disclosure.
Figure 4B:
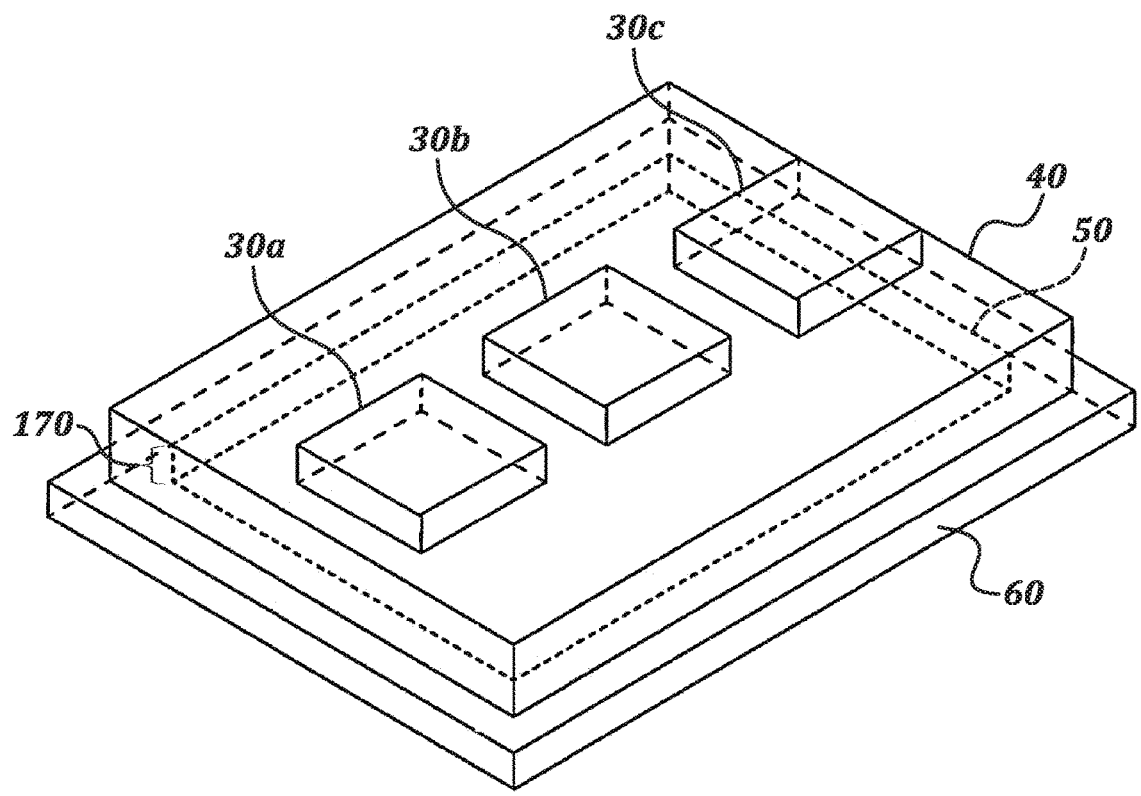

As shown in FIG. 4, in certain embodiments the fourth layer 30 is composed of a plurality of portions 30a-c coupled to the third layer 40. A plurality of portions of the fourth layer 30a-c is coupled to the third layer 40. In certain embodiments, the plurality of fourth layers 30 affords greater comfort to the body of the user 80. Further, in certain embodiments, an MDS 20 comprising the plurality of fourth layers 30a-c is configured to conform to portions of a body of a user 80 that are highly curved. Spaces disposed between the plurality of portions of the fourth layer 30a-c allow the MDS 20 to be curved to a greater degree than a single fourth layer 30 spanning an entire surface of the third layer 40.

As shown most clearly in FIG. 4, in certain embodiments, the MDS 20 is configured to form an enveloped space 170 enclosing at least a portion of the second layer 50. In certain embodiments, the second layer 50, including the enveloped portion of the second layer 50, is a lubricant. In certain embodiments, the lubricant may include a liquid lubricant, a solid lubricant, and a gaseous lubricant. In other embodiments, the lubricant is a graphite or a grease. In such embodiments, it is advantageous to envelope the lubricant so that it does not escape the MDS 20 during use.

In the embodiment shown in FIG. 4, the first layer 60 is coupled to the third layer 40 to form an enveloped space 170 enclosing at least a portion of the second layer 50 between the first layer 60 and the third layer 40. As shown, a portion of the third layer 40 bends to meet the first layer 60, thereby enveloping at least a portion of the second layer 50. In use, the second layer 50 is configured to facilitate relative lateral motion between the first layer 60 and the third layer 40 upon an impact force acting on the MDS 20 to reduce rotational acceleration and linear acceleration of the body of the user 80. Further, the second layer 50 remains disposed in the enveloped space 170.

Figure 12A:
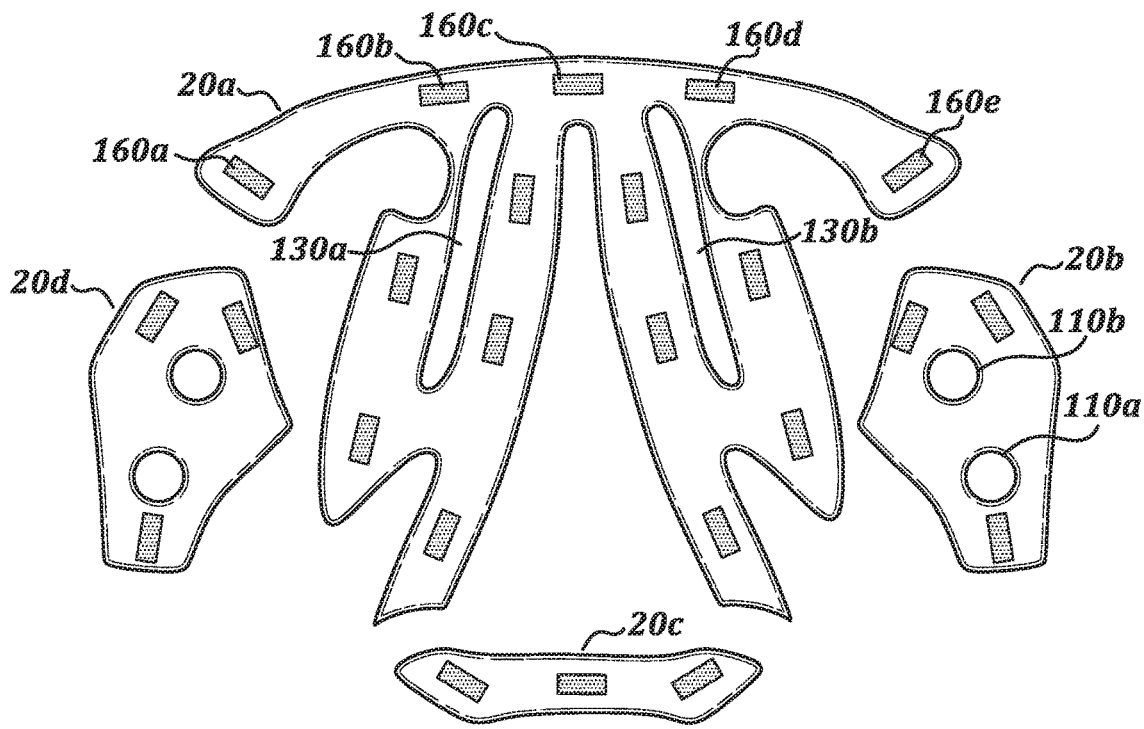
FIG. 12A is an illustration of a plurality of MDSs formed in accordance with a further embodiment of the present disclosure, configured to couple to a body-facing surface of protective equipment.

In certain embodiments, the first layer 60 and the third layer 40 are coupled at the edges of the first layer 60 and the third layer 40. In certain embodiments, the first layer 60 and the third layer 40 are coupled at a perimeter of the MDS 20. Referring to FIG. 12A a plurality of MDSs 20a-d are illustrated, wherein the first layer 60 is coupled to the third layer 40 by a coupling, for example, couplings 110a-b. In some embodiments, the first layer 60 and third layer 40 are coupled by couplings 110a-b at the perimeter of the MDS 20b. In these embodiments, placing the coupling at the edge and/or perimeter of the MDS 20 increases the enveloped space 170, wherein a larger enveloped space 170 inhibits a greater amount of energy transfer to the body of a user 80.

In certain embodiments, the first layer 60 and the third layer 40 are coupled using a coupling that may include a heat seal, a radio frequency seal, a sonic frequency seal, an ultrasonic frequency seal, hook and loop closures, an adhesive, stitches, a button system, a clipping system, a peel-and-stick material, or combinations thereof.

Figure 5A:
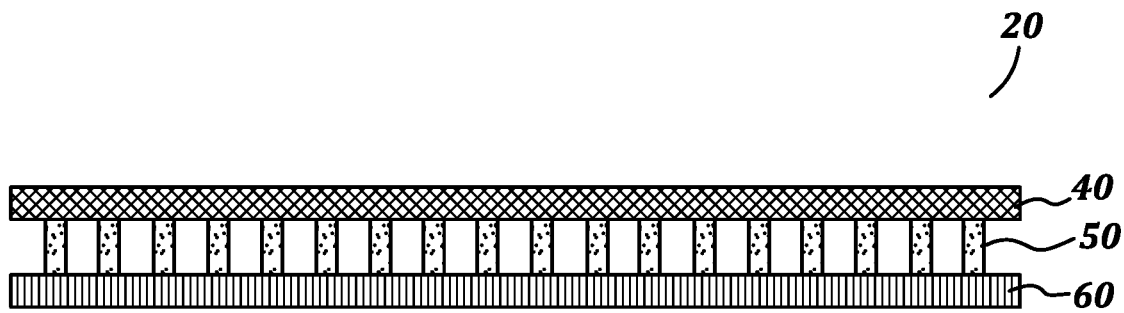
FIGS. 5A and 5B are respectively an illustration of a side view and an illustration of a corresponding isometric view of an MDS formed in accordance with another representative embodiment of the present disclosure.
Figure 5B:
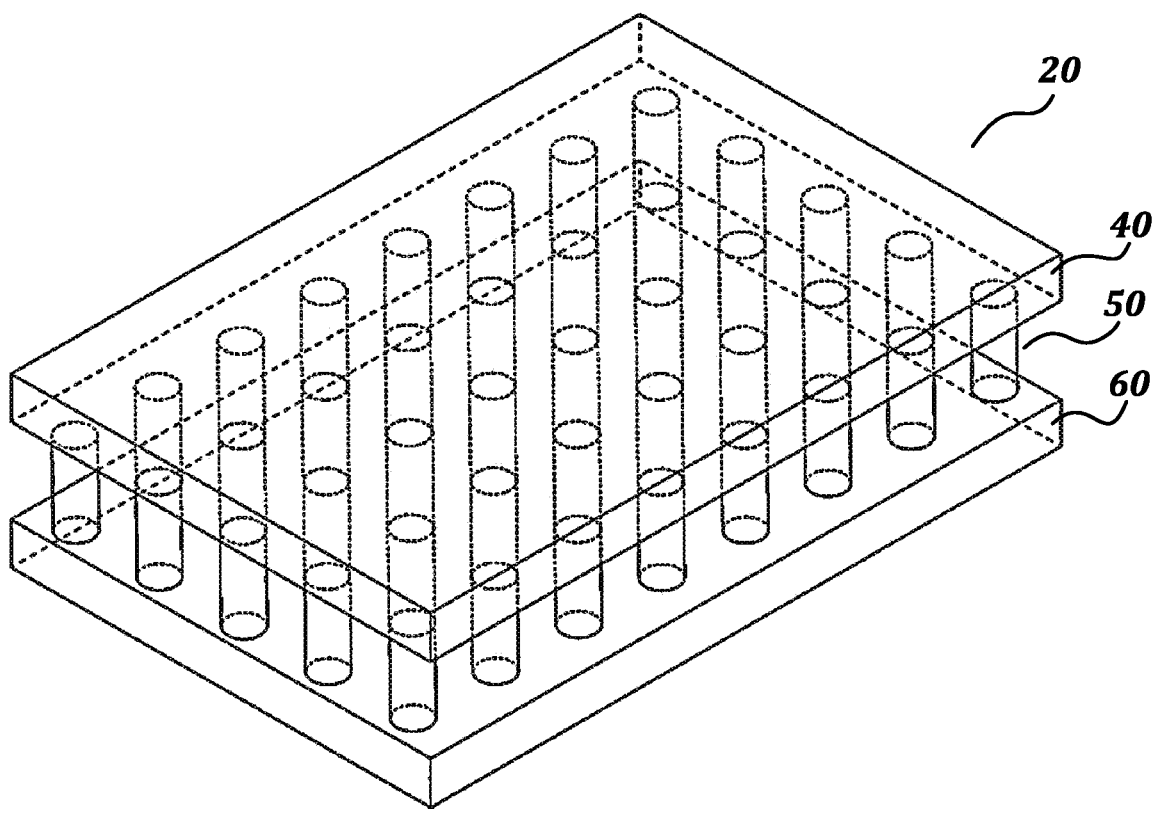

The MDS 20, according to certain embodiments disclosed herein, are configured to facilitate relative lateral motion upon an impact force acting on the MDS 20 to reduce rotational acceleration and linear acceleration of the body of the user 80. Accordingly, in certain embodiments, the second layer 50 is configured to facilitate relative lateral, "disengaging" motion between the first layer 60 and the third layer 40. FIGS. 5A and 5B illustrate a representative embodiment as disclosed herein in which the disengaging function of the second layer 50 is provided at least in part by a plurality of filaments 50 bridging the first layer 60 and the third layer 40. The plurality of filaments 50 bend or otherwise deform in response to an impact force acting on the MDS 20, thereby reducing rotational acceleration and linear acceleration of the body of the user.

In certain embodiments, the plurality of filaments 50a have a diameter in the range from about 0.1 mm to about 10 mm and a height in the range from about 0.1 mm to about 10 mm. In certain embodiments, the plurality of filaments 50 has a cross-sectional geometry that is circular, square, triangular, rectangular, polygonal, or ovoid.

In certain embodiments, as shown in FIGS. 5A and 5B, the plurality of filaments 50 is disposed between the first layer 60 and third layer 40 in an ordered or regular spacing.

Figure 6A:
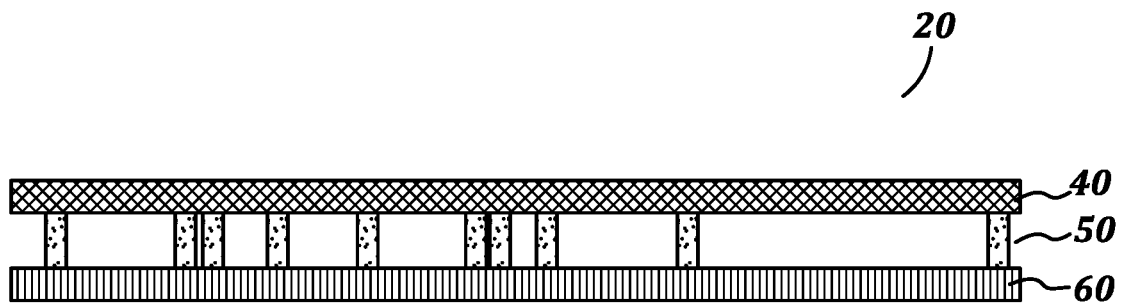
FIGS. 6A and 6B are respectively an illustration of a side view and an illustration of a corresponding isometric view of an MDS formed in accordance with another representative embodiment of the present disclosure.
Figure 6B:
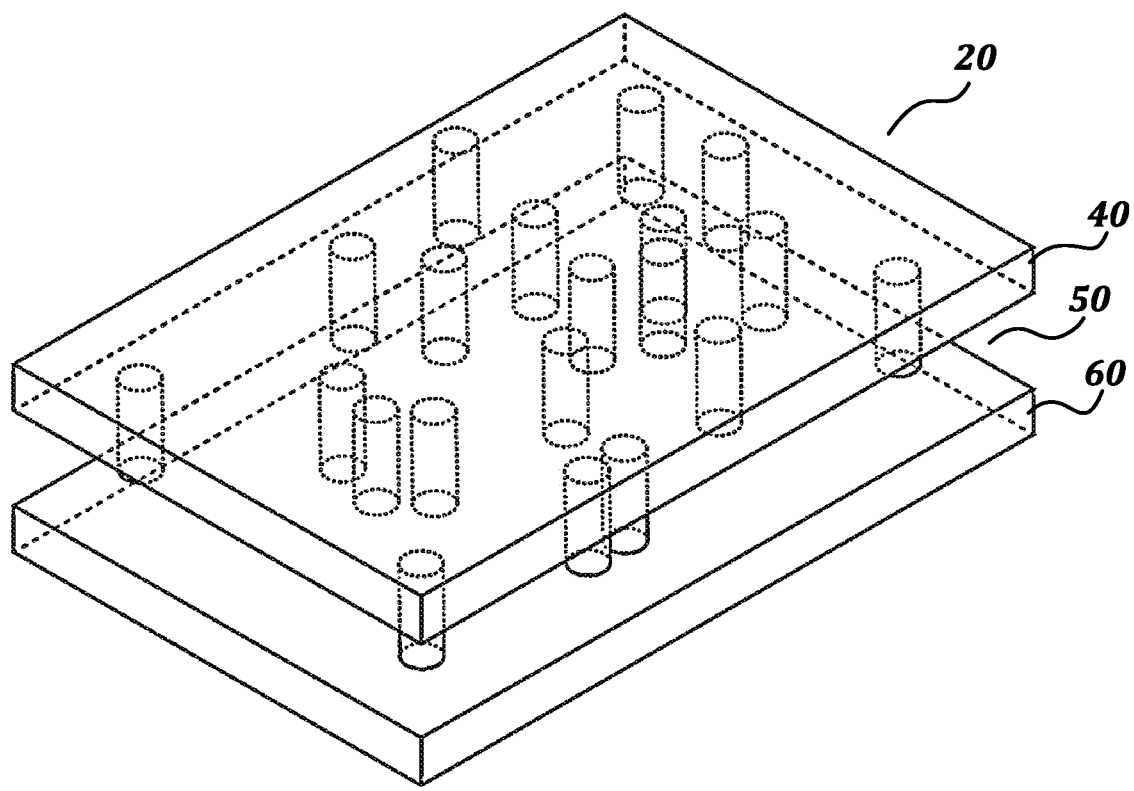

In certain embodiments, the plurality of filaments 50 is disposed between the first layer 60 and third layer 40 in a disordered or irregular spacing, as shown in FIGS. 6A and 6B. In certain embodiments, two or more filaments are connected to one another (not shown).

In some embodiments, the second layer 50 comprises a plurality of filaments 50 bridging the first layer 60 and the third layer 40 and a lubricant disposed among the plurality of filaments 50. In such an embodiment, the lubricant disposed among the plurality of filaments 50 further facilitates relative lateral motion between the first layer 60 and the third layer 40 upon an impact force acting on the MDS 20.

Figure 7A:
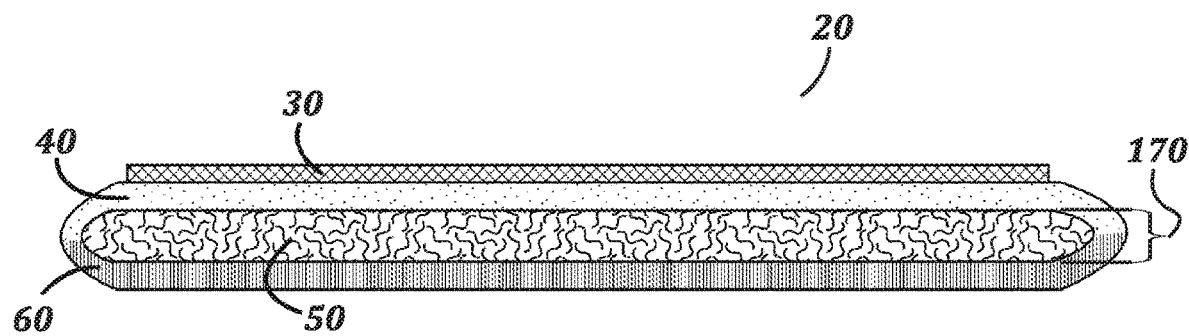
FIGS. 7A and 7B are respectively an illustration of a side view and an illustration of a corresponding isometric view of an MDS formed in accordance with another representative embodiment of the present disclosure.
Figure 7B:
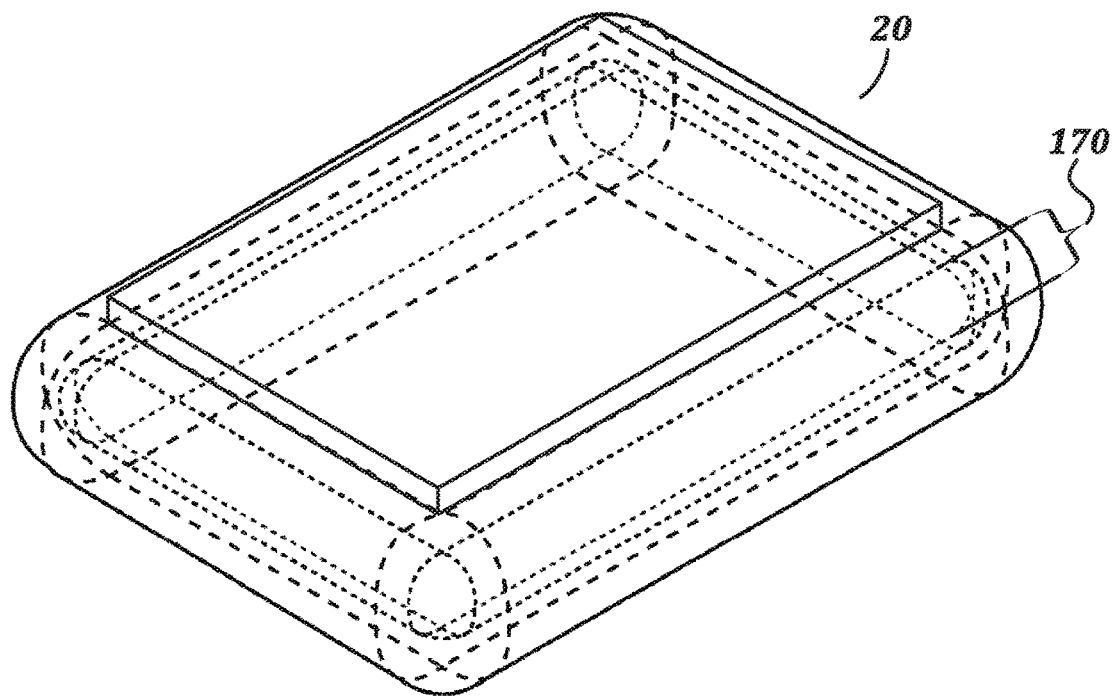

As illustrated in FIG. 7, in certain embodiments one or more layers of the MDS 20 have materials in common and/or are sealed to provide an enveloped space 170. In certain embodiments, one or more layers are suitably manufactured from one or more of thermosetting plastics, polycarbonate, plastic polymers, thermoplastics, carbon fiber composites, Kevlar composites, thermoset elastomers, Celstran, polypropylene, acrylonitrile butadiene styrene (ABS), expanded polystyrene (EPS), high density polyethylene (HDPE), glass reinforced plastics, Zytel, or any other energy-absorbing or force-spreading material which includes, but is not limited to, silicon rubber, vinyl, polyvinyl chloride (PVC), thermoplastic polyurethane (TPU), and polyurethane (PU).

Referring to FIG. 7, the first layer 60 is coupled to the third layer 40 to form an enveloped space 170 enclosing at least a portion of the second layer 50 between the first layer 60 and the third layer 40. In certain further embodiments, the first layer 60 and the third layer 40 are composed of a common material, such as polyurethane.

In another embodiment, the second layer 50 is comprised of filaments (not shown, described above) connecting and bridging the first layer 60 and the third layer 40, wherein the first layer 60, second layer 50, the third layer 40, and the fourth layer 30 are all composed of a single envelope, such as that provided by a silicone mold.

Figure 8A:
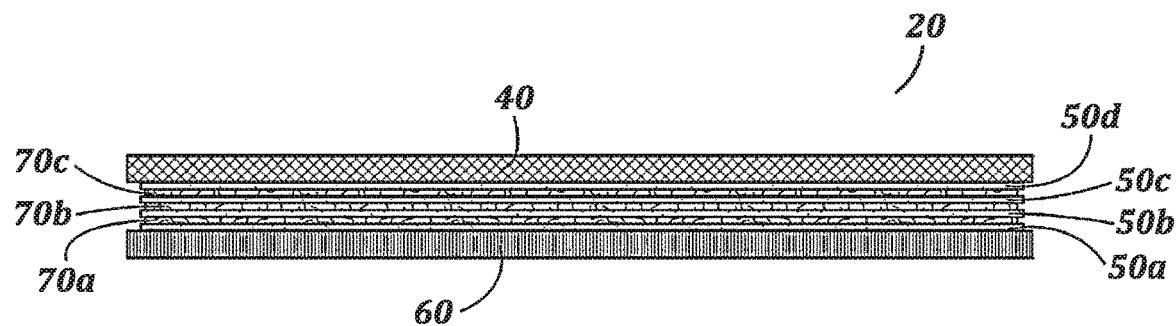
FIGS. 8A and 8B are respectively an illustration of a side view and an illustration of a corresponding isometric view of an MDS formed in accordance with another representative embodiment of the present disclosure.
Figure 8B:
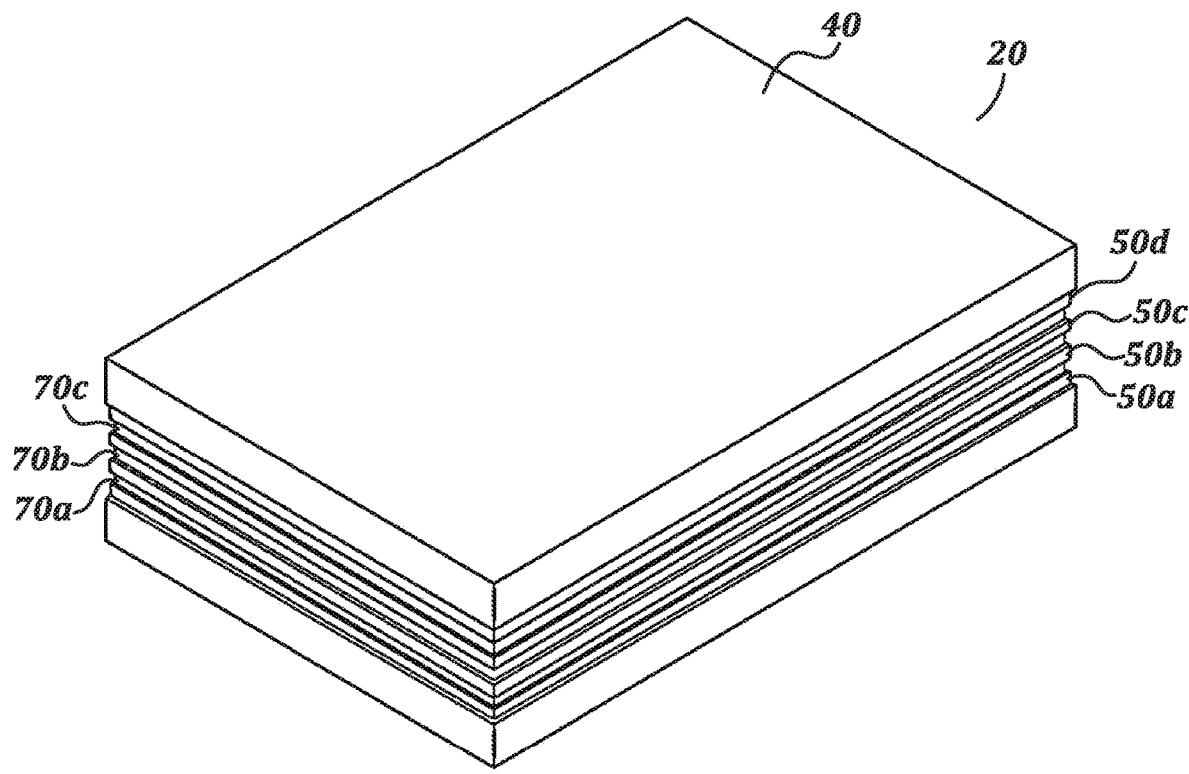

Referring to FIG. 8, in another embodiment disclosed herein, the MDS 20 comprises a plurality of intermediary layers 70a-c disposed between the first layer 60 and the third layer 40, each of the plurality of intermediary layers 70a-c having a second layer 50a-c therebetween, wherein the second layer 50a-c is configured to facilitate lateral relative motion between the intermediary layers 70a-c, and wherein the plurality of intermediary layers 70a-c is configured to facilitate lateral relative motion between the first layer 60 and third layer 40 upon an impact force acting on the MDS 20. The plurality of intermediary layers 70a-c and second layers 50a-c disposed therebetween are configured to further facilitate relative lateral motion between the first layer 60 and the third layer 40 upon an impact force acting on the MDS 20 to reduce rotational acceleration and linear acceleration of the body of the user 80. The second layers 50a-c can include materials of the second layer 50 according to any aspect or embodiment disclosed herein. In certain embodiments, the second layers 50a-c are self-lubricating, include graphite, have lubricant between them, or have abridging filaments 50 therebetween.

Figure 9:
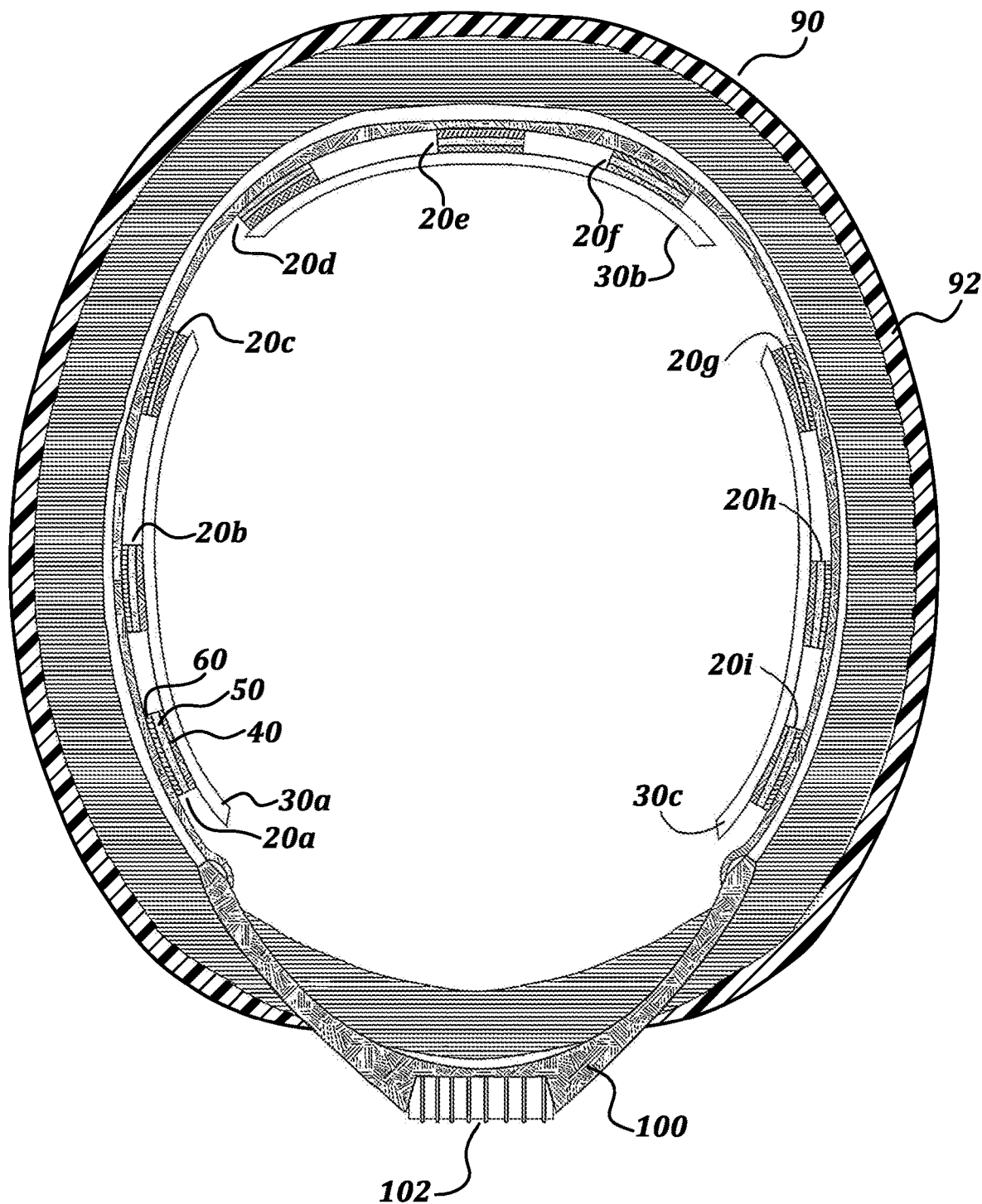
FIG. 9 is an illustration of a bottom view of a plurality of MDSs formed in accordance with embodiments of the present disclosure coupled to a body-facing surface of a fitting mechanism of a helmet.

FIG. 9 illustrates a plurality of MDSs 20a-i coupled to adjustable fitting system 100 of protective helmet 90. In certain embodiments, the MDS 20 as disclosed herein is configured to be couplable to a fitting system 100 of the protective equipment 90. Such fitting systems 100 include, for example, adjustable fitting systems in helmets, configured to adjust or modulate the fit of the protective equipment 90 to the body of the user 80 (described above). In certain embodiments, fitting systems 100 include an adjuster 102 configured to adjust the fit of the adjustable fitting system 100. As shown in FIG. 9, each MDS 20a-i comprises a first layer 60 couplable to a body-facing surface 96 of a protective equipment 90; a second layer 50 positioned adjacent to the first layer 60; and a third layer 40 positioned adjacent to the second layer 50. The MDS further comprises a fourth layer 30a-c positioned adjacent and coupled to the third layer 40, the fourth layer 30a-c configured to contact the body of the user 80. In certain embodiments, each portion of the fourth layer 30a-c is coupled to at least some of the plurality of MDSs 20, as shown in FIG. 9. For example, in the illustrated embodiment, MDS 20a-c are coupled to a single fourth layer 30a.

The adjustable fitting system 100 allows adjusting the plurality of fourth layer portions 30a-c to suit a range of head sizes, and to adjust the position of the helmet 90 on the body of a user 80. In this embodiment, the plurality of MDSs 20a-i replaces attachment components at the point of attachment of the plurality of fourth layer portions 30a-c to the adjustable fitting system 100. Accordingly, relative lateral motion between the first layer 60 and the third layer 40 is afforded on the adjustable fitting system 100, as well. In other embodiments, the plurality of MDSs 20a-i is coupled to the adjustable fitting system 100 in such a way to replace a stock fitting liner that may come with the helmet 90.

In other embodiments, the MDS 20 disclosed herein is couplable to protective equipment 90 other than helmets. In certain embodiments, the MDS 20 disclosed herein is couplable to a body-facing surface 96 of a protective equipment 90 configured to be worn on a part of the body including the head, neck, shoulders 84, upper arms 86, elbows, forearms 82, wrists, hands, chest, back, spine, hips, thighs, knees, shins, ankles, feet, and combinations thereof.

Figure 10:
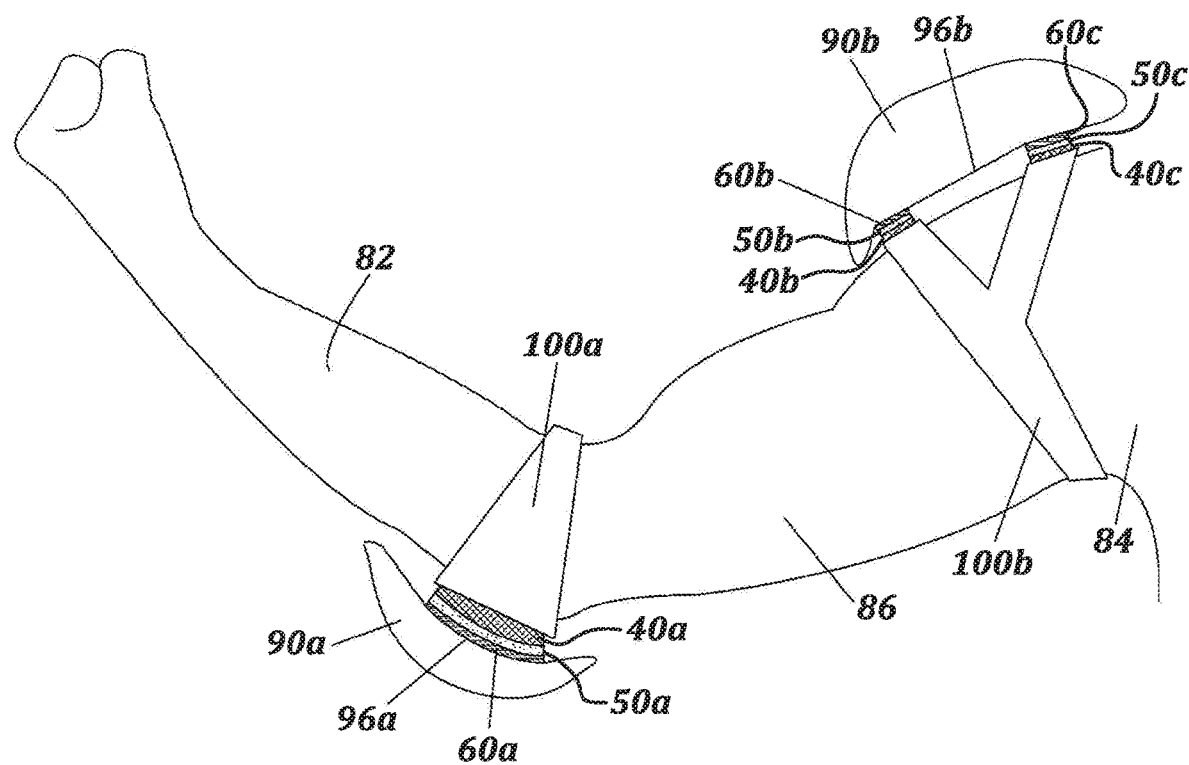
FIG. 10 is an image of certain embodiments of MDSs formed in accordance with an embodiment of the present disclosure coupled to a body-facing surface of an elbow pad and a shoulder pad.

As one illustrative example, FIG. 10 shows the application of the MDS 20 as disclosed herein on an elbow pad 90a and shoulder pads 90b. In such an embodiment, a single MDS 20a can be couplable to a protective equipment 90, such as a shoulder pad 90b. In certain embodiments, the MDS 20a is couplable to both the body-facing surface 96a of the protective equipment 90a and a fitting system 100a. Here the MDS 20a is couplable to the body-facing surface 96a through the first layer 60a and the fitting system 100a through the third layer 40a.

In certain embodiments, a plurality of MDSs 20b and 20c is couplable to a body-facing surface 96b of the protective equipment 90b. As depicted, the protective equipment is a shoulder pad 90b. In certain such embodiments, the MDS 20b and 20c are couplable to separate portions of the body-facing surface 96b and separate portions of the fitting system 100b. By coupling a plurality of MDSs 20b and 20c to different portions of the body-facing surface 96 of the protective equipment 90b, portions of the body of a user 80 experience a reduction in rotational and linear accelerations as a result of impact forces on the protective equipment.

Figure 11:
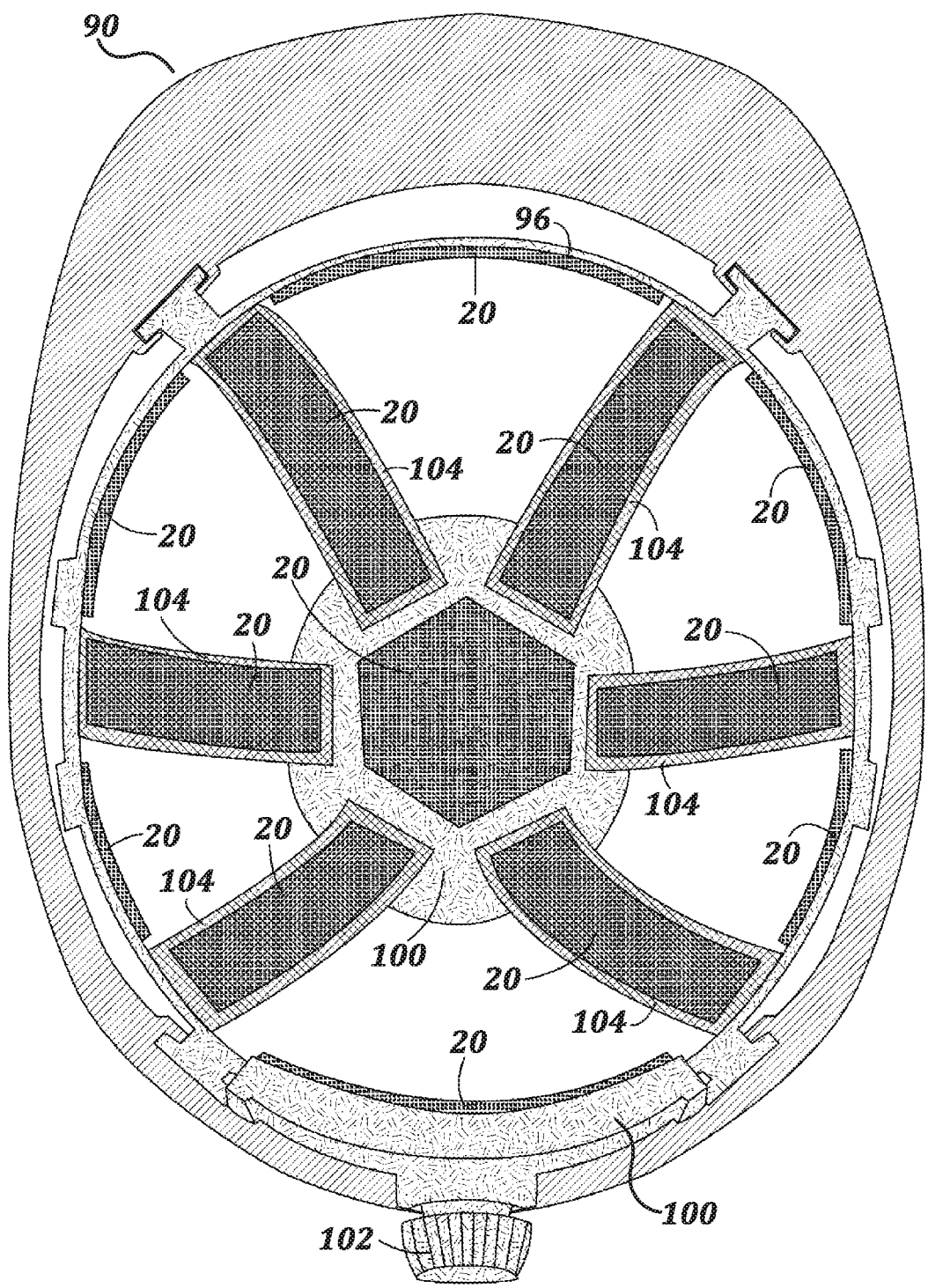
FIG. 11 is an illustration of a plurality of MDSs formed in accordance with an embodiment of the present disclosure coupled to a body-facing surface of a fitting rim and suspension band of a hard hat or bump cap.

Some currently available pieces of protective equipment include rib members 104 or other elongate structures. In this regard, rib members 104 or other elongate structures are configured to provide structural rigidity and absorb various impacts, while allowing airflow to the body of the user 80. In certain embodiments, the MDS 20 is configured to be couplable to a rib member 104 of the protective equipment 90 while still allowing airflow to the body of the user 80. In certain embodiments, the MDS 20 is configured to be couplable to a plurality of rib members. In certain embodiments, the rib members 104 include suspension bands in, for example, a hard hat or bump cap. As illustrated in FIG. 11, in one embodiment an MDS 20 can be coupled to the body-facing surface 96 of a fitting system 100, such as a fitting rim, or the body-facing surface 96 of suspension band 104 of a protective helmet 90, such as a hard hat or bump cap. The fitting rim 100 is part of the fitting system 100, which can be adjustable using an adjuster 102 as shown. The suspension bands 104 are attached to the fitting system 100 and space the rigid shell 92 of a helmet away from the body of a user 80 (not shown).

In certain embodiments, the MDS 20 as disclosed herein include an aperture 130 disposed through the first layer 60, second layer 50, third layer 40, and fourth layer 30. In certain embodiments, the aperture 130 is one of a plurality of apertures 130a and 130b. In embodiments shown in FIG. 12A, the plurality of apertures 130a and 130b extend through the MDS 20a such that when the MDS 20a is coupled to the protective equipment 90, apertures 150a-c extending through the protective equipment 90 are not occluded.

Figure 12B:
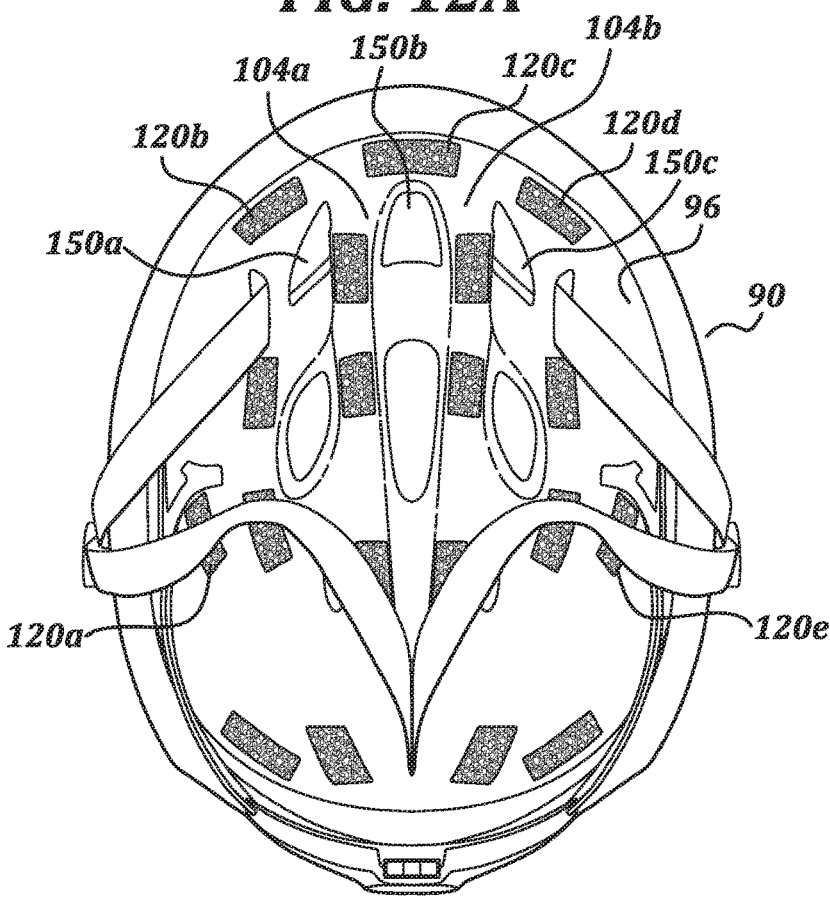
FIG. 12B is an illustration of a helmet configured to couple with the plurality of MDSs illustrated in FIG. 12A.

Referring to FIGS. 12A and 12B, in certain embodiments a plurality of MDSs 20a-d are provided, which are configured to couple to different portions of the body-facing surface 96 of the protective equipment 90. In certain embodiments, the MDS 20a-d include a first layer 60, which further includes an anchoring layer 160. For example, the anchoring layer 160 can include one-half of a hook and loop closure. The first MDS 20a-d include first layers 60, including portions having hook portions 160a-e configured to loop portions 120a-e disposed on the body-facing surface 96 of the protective equipment 90.

In certain embodiments, the MDS 20 are configured to couple with a rib member 104 of the protective equipment 80. Still referring to FIGS. 12A and 12B, the MDS 20a includes portions configured to couple to rib members 104a and 104b of the protective equipment 90. By coupling to the rib members 104a and 104b, the MDS both provides additional protection to the protective equipment 90 and allows airflow to the portions of the body of a user not directly adjacent to the rib members 104a and 104b.

In certain embodiments, the MDS 20 configured to couple with a rib member 104 of the protective equipment 80 includes a first layer 60 couplable to the rib member 104 of a protective equipment 90; a second layer 50 positioned adjacent to the first layer 60; a third layer 40 positioned adjacent to the second layer 50; and a fourth layer 30 positioned adjacent and coupled to the third layer 40, the fourth layer 30 configured to contact the body of the user 80. The first layer 60 is coupled to the third layer 40 to form an enveloped space 170 enclosing at least a portion of the second layer 50 between the first layer 60 and the third layer 40.

As shown in FIGS. 12A and 12B, a kit including a plurality of MDSs 20a-d configured to interface with the protective equipment 90. The plurality of MDSs 20a-d is configured to be couplable with the body-facing surface 96 of the helmet 90. Specifically, anchoring layer 160, including hook portions 160a-e, is configured couple to loop portions 120a-e disposed on the body-facing surface 96 of the protective equipment 90. As illustrated, the kit includes MDSs 20 that have the same shape and size, MDSs 20d and b, and MDSs 20 that are of different size and shape, MDSs 20a and 20c.

The kits disclosed herein are useful to, for example, retrofit existing protective equipment 90 with the MDS 20 of the kit and thereby provide or enhance disengaging motion upon an impact force acting on the protective equipment 90 to reduce rotational acceleration and linear acceleration of the body of the user 80. In certain embodiment, the kits disclosed herein include customized kits including a plurality of MDSs 20 sized and shaped to couple to a body-facing surface 96 of particular brands and/or models of protective equipment 90. Different brands and models of protective equipment have particular sizes and shapes of body-facing surfaces 96. Kits including the MDS 20 configured specifically couple to the size and shape of the body-facing surface 96 are likely provide better comfort and protection to the body of the user 80. Such customized kits can be configured to couple to portions of the body-facing surface 96 of the protective equipment 90 on which impact forces commonly act, such as a portion of a helmet configured to contact the forehead of a user 80. In certain embodiments, individual MDSs 20 are configured to couple to particular positions of and in particular orientations relative to the protective equipment 90. For example, MDS 20a is configured to couple to a portion of the helmet 90 that is configured to interact with a forehead of the user 80.

In certain embodiments, the kits disclosed herein are configured to replace an original equipment fitting liner 30 of protective equipment 90, such as a helmet. In certain embodiments, the kits disclosed herein are configured to couple a fitting liner 30 to the protective equipment 90, such that the MDSs 20 of the kit are coupled between the body-facing surface 96 and the fitting liner 30.

In another aspect, a protective system is disclosed herein. In certain embodiments, the protective system includes protective equipment 90 having a body-facing surface 96; and an MDS 20 couplable to the protective equipment 90. The MDS 20 is suitably an MDS 20 according to any aspect disclosed herein. In certain embodiments, the MDS 20 comprises: a first layer 60 couplable to a body-facing surface 96 of a protective equipment 90; a second layer 50 positioned adjacent to the first layer 60; a third layer 40 positioned adjacent to the second layer 50; and a fourth layer 30 positioned adjacent and coupled to the third layer 40. The fourth layer 30 is configured to contact the body of the user 80, wherein the first layer 60 is coupled to the third layer 40 to form an enveloped space 170 enclosing at least a portion of the second layer 50 between the first layer 60 and the third layer 40, wherein the second layer 50 is configured to facilitate relative lateral motion between the first layer 60 and the third layer 40 upon an impact force acting on the MDS 20 to reduce rotational acceleration and linear acceleration of the body of the user 80, wherein an area of the MDS 20 is smaller than the area of the body-facing surface 96.

In certain embodiments, the MDS 20 is one of a plurality of MDSs 20, each coupled to a portion of the body-facing surface 96.

In certain embodiments, wherein the protective equipment 90 is configured to be worn on the part of the body selected from the head, neck, shoulders 84, upper arms 86, elbows, forearms 82, wrists, hands, chest, back, spine, hips, thighs, knees, shins, ankles, feet, and a combination thereof. In certain embodiments, the protective equipment is a helmet, a shoulder pad, a neck pad, an arm pad, a wrist pad, a knee pad, a glove, an elbow pad, a shin pad, a hip pad, a sternum pad, a back pad, an ankle pad, a foot pad, and a shoe.

In another aspect, the present application provides a kit for interfacing with a body of a user 80 and a protective equipment 90. In certain embodiments, the kit comprises a plurality of MDSs 20, wherein each of the plurality of MDSs 20 is configured to be couplable to a body-facing surface 96 of a protective equipment 90. The MDS 20 can be any MDS 20 disclosed herein.

In certain embodiments, one or more of the plurality of MDSs 20 comprise: a first layer 60 couplable to a body-facing surface 96 of a protective equipment 90; a second layer 50 positioned adjacent to the first layer 60; a third layer 40 positioned adjacent to the second layer 50; and a fourth layer 30 positioned adjacent and coupled to the third layer 40, the fourth layer 30 configured to contact the body of the user 80, wherein the first layer 60 is coupled to the third layer 40 to form an enveloped space 170 enclosing at least a portion of the second layer 50 between the first layer 60 and the third layer 40, wherein the second layer 50 is configured to facilitate relative lateral motion between the first layer 60 and the third layer 40 upon an impact force acting on the MDS 20 to reduce rotational acceleration and linear acceleration of the body of the user 80, wherein an area of the MDS 20 is smaller than the area of the body-facing surface 96.

In certain embodiments, each of the plurality of MDSs 20 is configured to be couplable to a different portion of the body-facing surface 96 of the protective equipment 90.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the invention.

The invention claimed is:

1. A modular disengaging system for interfacing with the body of a user, comprising:
 a first layer couplable to a body-facing surface of a protective equipment, the first layer having a first surface opposite a second surface;
 a second layer positioned adjacent to the second surface of the first layer;
 a third layer having a first surface positioned adjacent to the second layer, the third layer having a second surface opposite the first surface of the third layer; and
 a fourth layer comprising a plurality of fourth layer portions, each fourth layer portion having a first surface positioned adjacent and coupled to the second surface of the third layer, each of the fourth layer portions having a second surface opposite the first surface of the fourth layer portion, the second surface of the fourth layer portion being configured to contact the body of the user, wherein the plurality of fourth layer portions are spaced apart by spaces along the second surface of the third layer, wherein the spaces are defined by a gap extending from the second surface of the third layer to the second surface of the fourth layer;
 wherein edges of the first layer are coupled to edges of the third layer, forming an enveloped sealed space enclosing the second layer between the first layer and the third layer;

wherein the second layer is configured to facilitate relative lateral motion between the first layer and the third layer upon an impact force acting on the modular disengaging system to reduce rotational acceleration and linear acceleration of the body of the user.

2. The modular disengaging system of claim 1, wherein the first layer comprises an anchoring layer configured to removably couple the modular disengaging system to the body-facing surface of the protective equipment.

3. The modular disengaging system of claim 2, wherein the anchoring layer comprises a material selected from the group consisting of hook and loop closures, adhesive, stiches, glue, a button system, a clip system, a peel-and-stick material, and combinations thereof.

4. The modular disengaging system of claim 1, wherein the modular disengaging system is configured to conform to the body-facing surface of the protective equipment.

5. The modular disengaging system of claim 1, wherein the modular disengaging system is configured to be couplable to a fitting system of the protective equipment.

6. The modular disengaging system of claim 1, wherein the modular disengaging system is configured to be couplable to a rib member of the protective equipment.

7. The modular disengaging system of claim 1, wherein the first layer is configured to be directly coupled to the body-facing surface of the protective equipment.

8. The modular disengaging system of claim 1, wherein the first layer and the third layer are coupled at a perimeter of the modular disengaging system.

9. The modular disengaging system of claim 1, wherein the first layer and the third layer are coupled using a coupling selected from the group consisting of a heat seal, a radio frequency seal, a sonic frequency seal, an ultrasonic frequency seal, hook and loop closures, an adhesive, stitches, a button system, a clipping system, a peel-and-stick material, and combinations thereof.

10. The modular disengaging system of claim 1, further comprising a plurality of intermediary layers disposed between the first layer and the third layer, each of the plurality of intermediary layers having a disengaging layer therebetween, wherein the disengaging layer is configured to facilitate lateral relative motion between the intermediary layers, and wherein the plurality of intermediary layers is configured to facilitate lateral relative motion between the first and third layer upon an impact force acting on the modular disengaging system.

11. The modular disengaging system of claim 1, wherein the second layer comprises a lubricant.

12. The modular disengaging system of claim 11, wherein the lubricant is selected from the group consisting of a liquid, a solid, and a gas.

13. The modular disengaging system of claim 1, wherein the second layer comprises a plurality of filaments bridging the first layer and the third layer.

14. The modular disengaging system of claim 1, wherein the plurality of fourth layer portions is coupled to the third layer using a coupling selected from the group consisting of a heat seal, a radio frequency seal, a sonic frequency seal, an ultrasonic frequency seal, hook and loop closures, an adhesive, stitches, a button system, a clipping system, a peel-and-stick material, and combinations thereof.

15. The modular disengaging system of claim 1, wherein the plurality of fourth layer portions is coupled to the third layer at a perimeter of the third layer.

16. The modular disengaging system of claim 1, wherein the plurality of fourth layer portions is coupled directly to the surface of the third layer.

17. The modular disengaging system of claim 1, wherein the plurality of fourth layer portions has an area smaller than an area of the surface of the third layer.

18. A kit, comprising:
a plurality of the modular disengaging systems of claim 1, wherein each of the plurality of modular disengaging systems is configured to be couplable to a body-facing surface of a protective equipment.

19. The kit of claim 18, wherein each of the plurality of modular disengaging systems is configured to be couplable to a different portion of the body-facing surface of the protective equipment.

20. The modular disengaging system of claim 1, wherein an edge surrounding an entire perimeter of the third layer is coupled to the second surface of the first layer to form the enveloped sealed space enclosing the second layer between the first layer and the third layer.

21. A modular disengaging system for interfacing with the body of a user, comprising:
a first layer couplable to a body-facing surface of a protective equipment;
a second layer positioned adjacent to the first layer;
a third layer positioned adjacent to the second layer; and
a fourth layer comprising a plurality of fourth layer portions positioned adjacent and coupled to a surface of the third layer, each of the fourth layer portions being configured to contact the body of the user, wherein the plurality of fourth layer portions are spaced apart along the surface of the third layer;
wherein the first layer is coupled to the third layer to form an enveloped space enclosing at least a portion of the second layer between the first layer and the third layer;
wherein the second layer is configured to facilitate relative lateral motion between the first layer and the third layer upon an impact force acting on the modular disengaging system to reduce rotational acceleration and linear acceleration of the body of the user; and
a plurality of intermediary layers disposed between the first layer and the third layer, each of the plurality of intermediary layers having a disengaging layer therebetween, wherein the disengaging layer is configured to facilitate lateral relative motion between the intermediary layers, and wherein the plurality of intermediary layers is configured to facilitate lateral relative motion between the first and third layer upon an impact force acting on the modular disengaging system.

* * * * *